US012459293B2

(12) United States Patent
Abdellatif et al.

(10) Patent No.: US 12,459,293 B2
(45) Date of Patent: Nov. 4, 2025

(54) SYSTEM AND METHOD FOR ACTUATION TO CONTROL MAGNETIC WHEEL ADHESION

(71) Applicant: Saudi Arabian Oil Company, Dhahran (SA)

(72) Inventors: Fadl Abdellatif, Thuwal (SA); Hesham Jifri, Thuwal (SA); Abdulwahab Halawani, Thuwal (SA); Ahmed Al Brahim, Thuwal (SA); Ali J. Alrasheed, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 751 days.

(21) Appl. No.: 17/660,550

(22) Filed: Apr. 25, 2022

(65) Prior Publication Data

US 2023/0339262 A1 Oct. 26, 2023

(51) Int. Cl.
*B60B 19/00* (2006.01)
*B60F 5/02* (2006.01)
*B62D 57/024* (2006.01)

(52) U.S. Cl.
CPC .......... *B60B 19/006* (2013.01); *B62D 57/024* (2013.01); *B60F 5/02* (2013.01)

(58) Field of Classification Search
CPC ....... B60B 3/08; B60B 19/00; B60B 2900/93; B62D 57/024; B60F 5/02
See application file for complete search history.

(56) References Cited

U.S. PATENT DOCUMENTS

| 2,694,164 | A | | 11/1954 | Geppelt | |
|---|---|---|---|---|---|
| 4,013,241 | A | * | 3/1977 | Gray | A01K 89/01555 242/287 |
| 4,616,796 | A | | 10/1986 | Inoue | |
| 6,125,955 | A | * | 10/2000 | Zoretich | B60B 19/006 180/7.1 |

(Continued)

FOREIGN PATENT DOCUMENTS

| CA | 3059845 A1 | 4/2020 |
|---|---|---|
| CN | 105711673 B | 12/2017 |

(Continued)

OTHER PUBLICATIONS

Saudi Examination Report of related SA123446969, dated Feb. 28, 2024. [5 pages].

*Primary Examiner* — Jeremy A Luks
(74) *Attorney, Agent, or Firm* — Leason Ellis LLP (57) ABSTRACT

An actuation system and method are actuated to control magnetic adhesion of a wheel to a surface. The actuation system is coupled to the wheel having inner and outer annular discs and the wheel is configured to adhere magnetically to a surface. The actuation system has a motor configured to rotate a first disc and to not rotate a second disc. In a first configuration, the motor rotates the first disc relative to the second disc in a first rotational direction, thereby generating a first magnetic flux to increase the adhesion of the wheel to the metallic surface. In a second configuration, the motor rotates the first disc relative to the second disc in a second rotational direction opposite the first rotational direction, thereby generating a second magnetic flux to decrease the adhesion of the wheel to the metallic surface. A method is also disclosed.

20 Claims, 8 Drawing Sheets

(56) References Cited

U.S. PATENT DOCUMENTS

| | | | |
|---|---|---|---|
| 6,707,360 | B2 | 3/2004 | Underwood et al. |
| 6,930,421 | B2 | 8/2005 | Wise |
| 7,233,221 | B2* | 6/2007 | Reboredo Losada ........................ B60B 19/006 301/5.23 |
| 8,522,905 | B2 | 9/2013 | Lama |
| 9,579,927 | B2* | 2/2017 | Parrott ................. B60B 19/003 |
| 10,145,451 | B2* | 12/2018 | Pyrhonen .............. F16D 27/108 |
| 10,239,347 | B2* | 3/2019 | Abdellatif ............. B60B 19/003 |
| 10,336,133 | B2* | 7/2019 | Lee ........................ B60B 19/12 |
| 10,830,837 | B2* | 11/2020 | Oetiker ................. G01R 33/02 |
| 11,017,927 | B2* | 5/2021 | Clymer ..................... F03G 3/08 |
| 2006/0220393 | A1 | 10/2006 | Dimig et al. |
| 2009/0058234 | A1 | 3/2009 | Chen |
| 2009/0078484 | A1 | 3/2009 | Kocijan |
| 2018/0370279 | A1* | 12/2018 | Reboredo Losada ... B61C 15/04 |
| 2020/0094618 | A1* | 3/2020 | La .......................... B60C 11/14 |
| 2020/0300310 | A1* | 9/2020 | Kostic ................... F16D 65/186 |
| 2021/0188330 | A1* | 6/2021 | Saiz ........................ B61F 5/307 |
| 2022/0291676 | A1* | 9/2022 | Arab ..................... B62D 57/024 |
| 2023/0339262 | A1* | 10/2023 | Abdellatif ............ B62D 57/024 |
| 2023/0356543 | A1* | 11/2023 | Abdellatif ............. B60B 19/006 |
| 2023/0356544 | A1* | 11/2023 | Abdellatif ............. B60B 19/006 |
| 2023/0356757 | A1* | 11/2023 | Carbonell ............. B60B 19/006 |
| 2023/0364940 | A1* | 11/2023 | Halawani .............. B60B 19/006 |
| 2023/0364941 | A1* | 11/2023 | Abdellatif ................. B60B 3/00 |
| 2023/0364942 | A1* | 11/2023 | Abdellatif ............. B60B 19/006 |
| 2023/0364943 | A1* | 11/2023 | Abdellatif ............. H01F 7/0231 |

FOREIGN PATENT DOCUMENTS

| | | |
|---|---|---|
| DE | 10359821 A1 | 9/2005 |
| EP | 0200837 A2 | 11/1986 |
| JP | 2011172432 A | 9/2011 |
| JP | 2020200870 A2 | 12/2020 |
| WO | 1999048187 A1 | 9/1999 |

* cited by examiner

SYSTEM AND METHOD FOR ACTUATION TO CONTROL MAGNETIC WHEEL ADHESION

FIELD OF THE DISCLOSURE

The present disclosure relates generally to magnetized wheels, and, more particularly, to a system and method for actuation to control magnetic adhesion of a wheel to a metallic surface.

BACKGROUND OF THE DISCLOSURE

Magnetic wheels enable vehicles to climb and drive on metallic structures. For example, an unmanned aerial vehicle (UAV) can fly to a point on a metallic structure, perch at that point, and utilize magnetic wheels to adhere to the metallic structure. The magnetic adhesion is the result of magnetic flux passing through the surface from the magnet north pole to the magnetic south pole of a magnet in the wheel. Having a strong magnetic grip to the metallic surface is essential to prevent the vehicle from disengaging inadvertently and from falling from the metallic surface. However, a strong pulling force is required to overcome the magnetic adhesion to disengage the vehicle from the metallic surface. In order to enable vehicles to obtain a strong magnetic grip as well as easy disengagement, incorporation of a magnetic switch into the wheel is desirable.

SUMMARY OF THE DISCLOSURE

According to an embodiment consistent with the present disclosure, a system and method actuate to control magnetic adhesion of a wheel to a metallic surface.

In an embodiment, an actuation system is coupled to a wheel having an inner annular disc and an outer annular disc. The wheel is configured to adhere magnetically to a metallic surface. At least one of the inner annular disc and the outer annular disc has a magnetic element. The actuation system comprises a motor configured to rotate a first disc of the inner annular disc or the outer annular disc, and to not rotate a second disc of the inner annular disc or the outer annular disc. In a first configuration, the motor rotates the first disc relative to the second disc by a predetermined rotational angle in a first rotational direction, thereby generating a first magnetic flux between the metallic surface and one of the first disc and the second disc to increase the adhesion of the wheel to the metallic surface. In a second configuration, the motor rotates the first disc relative to the second disc by a predetermined rotational angle in a second rotational direction opposite the first rotational direction, thereby generating a second magnetic flux between the metallic surface and the one of the first disc and the second disc to decrease the adhesion of the wheel to the metallic surface. The second magnetic flux is less than the first magnetic flux.

The first disc can be the inner annular disc, and the second disc can be the outer annular disc. The actuation system can have a brake configured to stop rotation of the inner annular disc. Alternatively, the brake can be configured to stop rotation of the outer annular disc. The first disc can the outer annular disc, and the second disc can be the inner annular disc. A clutch can be configured to engage the outer annular disc. A coil carrier can be coupled to the outer annular disc and configured to retain an electromagnetic coil. Activation of the electromagnetic coil rotates the inner annular disc relative to the outer annular disc to control the magnetic flux of the wheel, thereby controlling the adhesion of the wheel to the metallic surface.

In another embodiment, a vehicle comprises a chassis, a wheel, and an actuation system having a motor. The wheel is coupled to the chassis and has an inner annular disc and an outer annular disc. The wheel is configured to adhere magnetically to a metallic surface. At least one of the inner annular disc and the outer annular disc has a magnetic element. The actuation system is disposed in the chassis and is coupled to the wheel. The motor is configured to rotate a first disc of the inner annular disc or the outer annular disc, and to not rotate a second disc of the inner annular disc or the outer annular disc. In a first configuration, the motor rotates the first disc relative to the second disc by a predetermined rotational angle in a first rotational direction, thereby generating a first magnetic flux between the metallic surface and one of the first disc and the second disc to increase the adhesion of the wheel to the metallic surface. In a second configuration, the motor rotates the first disc relative to the second disc by a predetermined rotational angle in a second rotational direction opposite the first rotational direction, thereby generating a second magnetic flux between the metallic surface and the one of the first disc and the second disc to decrease the adhesion of the wheel to the metallic surface. The second magnetic flux is less than the first magnetic flux.

The first disc can be the inner annular disc, and the second disc can be the outer annular disc. A brake is configured to stop rotation of the inner annular disc. Alternatively, the brake can be configured to stop rotation of the outer annular disc. The first disc can be the outer annular disc, and the second disc can be the inner annular disc. The vehicle can have a clutch configured to engage the outer annular disc. The vehicle can have a coil carrier coupled to the outer annular disc and configured to retain an electromagnetic coil. Activation of the electromagnetic coil rotates the inner annular disc relative to the outer annular disc to control the magnetic flux of the wheel, thereby controlling the adhesion of the wheel to the metallic surface.

In a further embodiment, a method comprises providing a vehicle having a wheel with an inner annular disc and an outer annular disc. The wheel is configured to adhere magnetically to a metallic surface. At least one of the inner annular disc and the outer annular disc has a magnetic element. The method also includes providing an actuation system disposed in the vehicle and coupled to the wheel. The actuation system has a motor configured to rotate a first disc of the inner annular disc or the outer annular disc, and to not rotate a second disc of the inner annular disc or the outer annular disc. The method then rotates the first disc relative to the second disc by a predetermined rotational angle in a first rotational direction. The method then generates a first magnetic flux between the metallic surface and one of the first disc and the second disc to increase the adhesion of the wheel to the metallic surface. The method then rotates the first disc relative to the second disc by a predetermined rotational angle in a second rotational direction opposite the first rotational direction. The method then generates a second magnetic flux between the metallic surface and the one of the first disc and the second disc to decrease the adhesion of the wheel to the metallic surface. The second magnetic flux is less than the first magnetic flux.

The first disc can be the inner annular disc, and the second disc can be the outer annular disc. Rotation of the inner annular disc is stopped by a brake. Alternatively, rotation of the outer annular disc is stopped by a brake. The first disc can be the outer annular disc, and the second disc can be the inner annular disc. The outer annular disc can engage a clutch.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method for actuation to control magnetic adhesion of a wheel to a metallic surface.

Figures 1, 2:
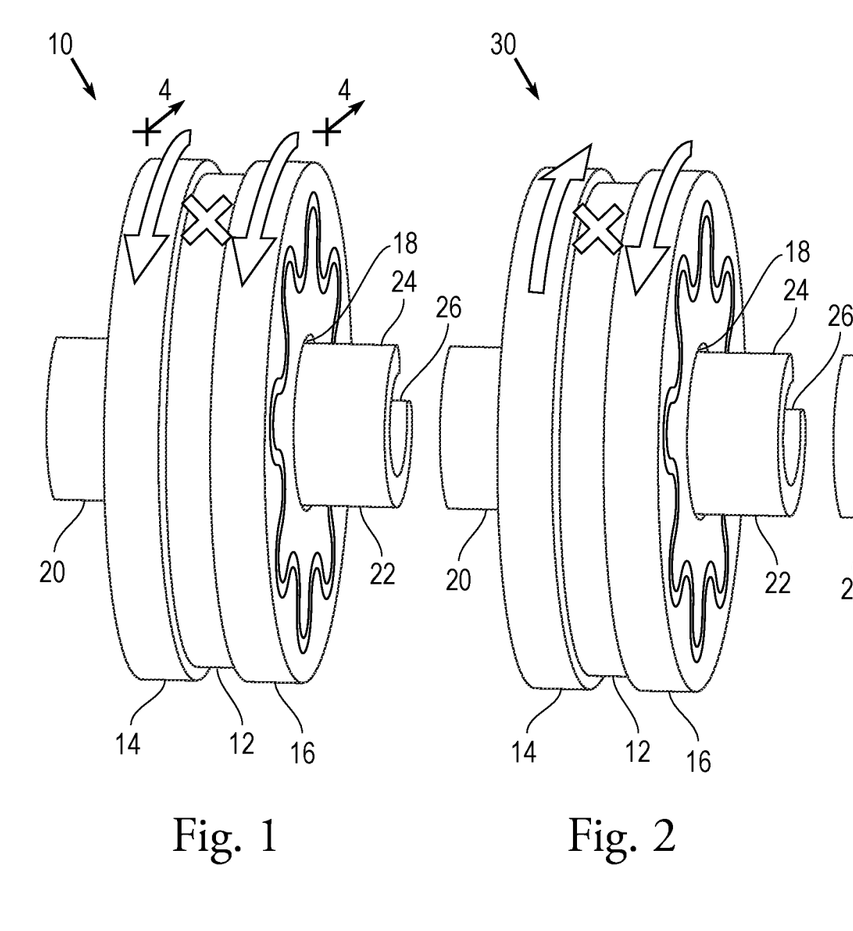
FIG. 1 illustrates a wheel having outer discs rotating in a common direction relative to an inner disc.
FIG. 2 illustrates an alternative embodiment of a wheel having outer discs rotating in opposite directions relative to the inner disc.

Referring to FIG. 1, the wheel 10 is configured to roll on a surface. Using the system and method described below, when the surface is metallic, a magnetic flux generated by the wheel 10 can be controlled to increase or decrease magnetic adhesion of the wheel 10 to the metallic surface. The wheel 10 has an inner disc 12, and at least one outer disc 14, 16 disposed adjacent to a respective planar side of the inner disc 12. Each outer disc 14, 16 has a central axial bore 18 configured to receive a respective disc retainer 20, 22 through which an axle passes. The central axial bore 18 of each outer disc 14, 16 has a rotation stopper for engaging radial sides 24, 26 on each disc retainer 20, 22. The radial sides 24, 26 limit the rotation of each outer disc 14, 16 relative to the inner disc 12 to a predetermined angle. The predetermined angle is equal to 180°/(the number of outer magnets on an outer circumferential periphery of the inner disc). For example, in an embodiment with eight outer magnets, the predetermined angle can be about 180°/8, which is about 22.5°.

Figure 3:
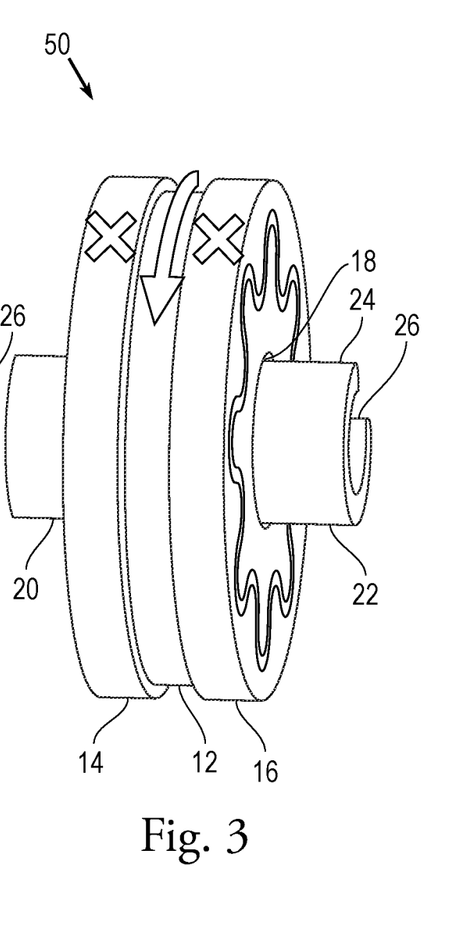
FIG. 3 illustrates another alternative embodiment of a wheel having an inner disc rotating relative to both of the outer discs.

FIG. 1 illustrates the outer discs 14, 16 of the wheel 10 rotating in a common direction relative to the inner disc 12. As shown in FIG. 1, the inner disc 12 can be motionless as the outer discs 14, 16 rotate in a common direction. FIG. 2 illustrates an alternative embodiment, with a wheel 30 having the outer discs 14, 16 rotating in opposite directions relative to the inner disc 12. As shown in FIG. 2, the inner disc 12 can be motionless as the outer discs 14, 16 rotate in opposite directions. FIG. 3 illustrates another alternative embodiment, with a wheel 50 having the inner disc 12 rotating relative to both of the outer discs 14, 16. As shown in FIG. 3, the inner disc 12 can be rotated as the outer discs 14, 16 remain motionless.

Figure 4:
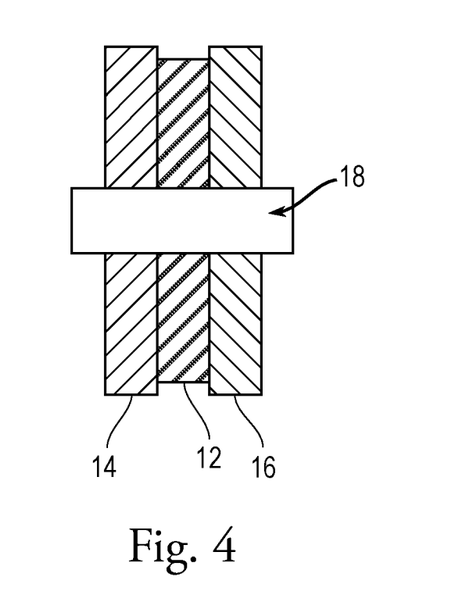
FIG. 4 is a cross-sectional view of the wheels of FIGS. 1-3 along lines 4-4 in FIG. 1.
Figure 5:
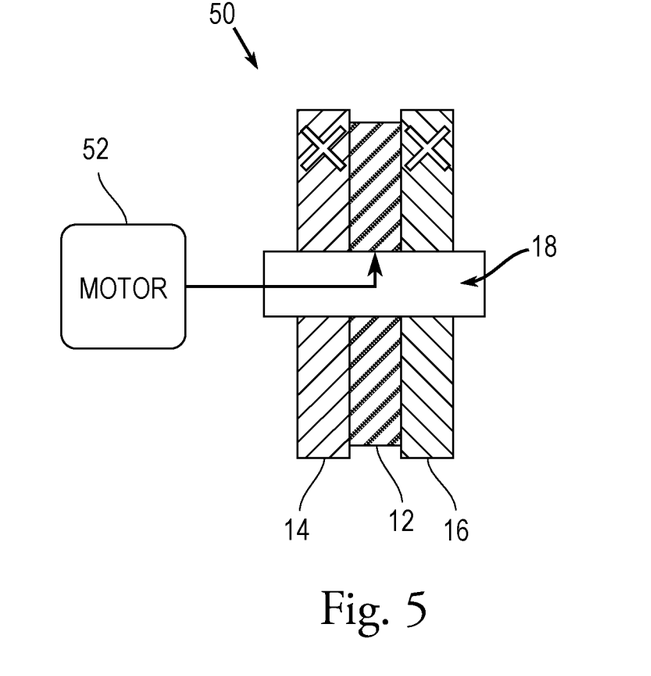
FIG. 5 is a cross-sectional view of an actuation system for the wheel shown in FIG. 3 in a first embodiment.

FIG. 4 illustrates a cross-sectional view of any one of the wheels 10, 30, 50 in FIGS. 1-3, respectively. As shown in FIG. 4, the central axial bore 18 allows an axle to pass therethrough, as well as other components as described below and configured to implement an actuation system. Each actuation system is configured to selectively control the magnetic flux of the wheel 10, 30, 50. Such selective control of the magnetic flux in turn controls the adhesion of the wheel 10, 30, 50 to a metallic surface. In a first embodiment of an actuation system, shown in FIGS. 5-8, the wheel 50 shown in FIG. 3 has a motor 52 configured to drive the inner disc 12, and a brake 54 configured to brake at least one of the outer discs 14, 16. Once the discs 12, 14, 16 are configured to have the wheel 50 magnetically adhere to a metallic surface 56, the brake 54 can be disengaged from the at least one outer disc 14, 16. The motor 52 then drives the inner disc 12 and, in turn, the wheel 50 along the metallic surface 56.

Figures 6, 7, 8, 9:
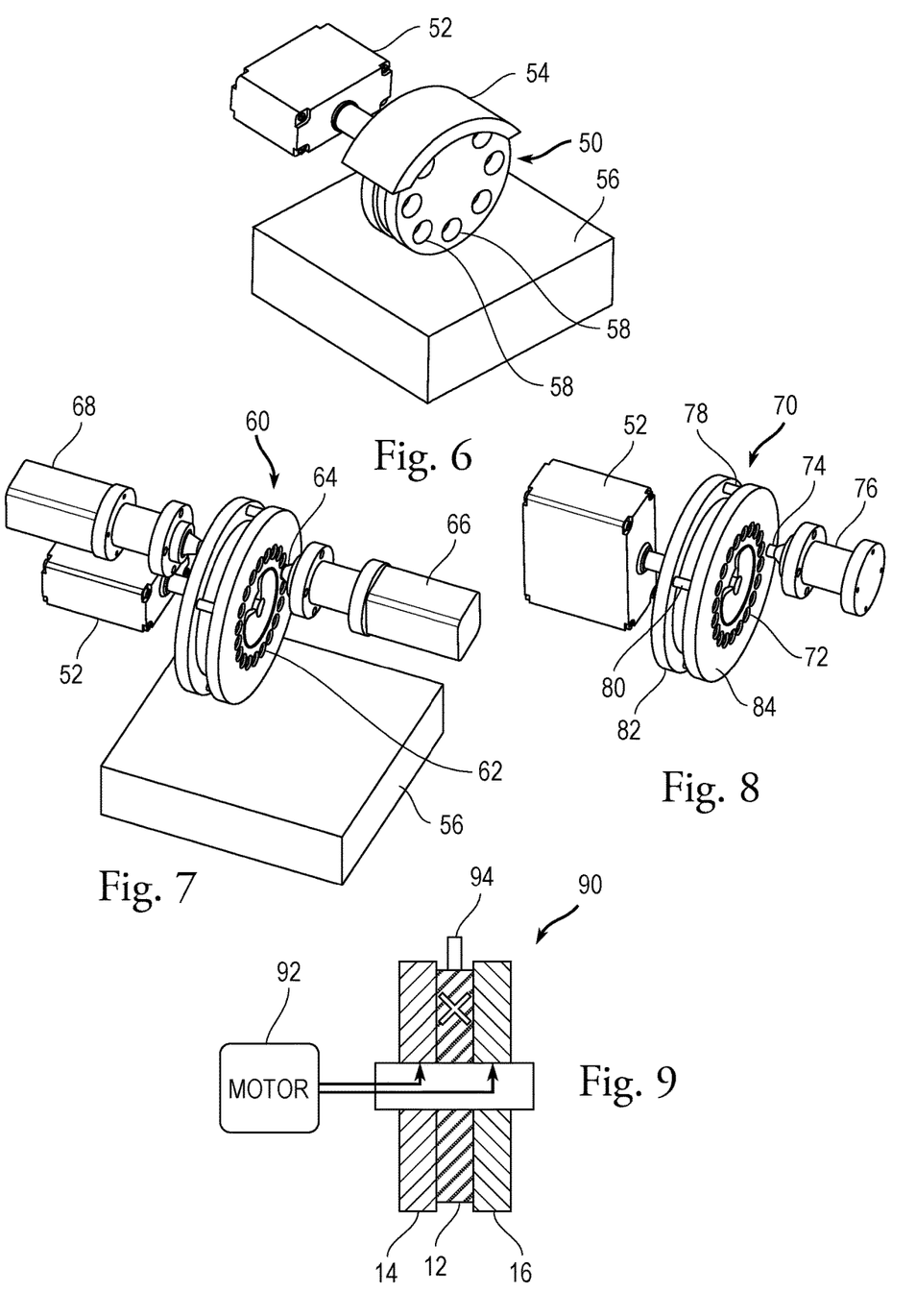
FIGS. 6-8 are top front perspective views of an actuation system of FIG. 5.
FIG. 9 is a cross-sectional view of an actuation system in a second embodiment.

However, when the brake 54 is applied, the magnetism of the overall wheel 50 is selected by the limited rotation of either outer disc 14, 16 relative to the inner disc 12 to a predetermined angle, as described above. For example, the outer discs 14, 16 can be magnetic, while the inner disc 12 has magnets in apertures 58 as shown in FIG. 6. The magnets can be permanent magnets. Alternatively, at least one of the magnets can be electromagnets. In another alternative embodiment, a predetermined combination of metallic structures, permanent magnets, and electromagnets can be implemented. The relative rotation of at least one outer disc 14, 16 either clockwise or anti-clockwise controls the degree of magnetic flux between the magnetic outer discs 14, 16 and the metallic surface 56 by virtue of supplemental or destructive flux lines due to the combined effect of the magnetic outer discs and the selected position of the magnet-bearing apertures 58 of the inner disc. Accordingly, magnetic adhesion between the wheel 50 and the metallic surface 56 can be controlled by changing the relative rotational position of the magnet-bearing apertures 58 relative to the outer discs. The principles of operation of the wheel 50 shown in FIGS. 3 and 5-9 to be driven and to control the magnetic adhesion can also be applied to the wheels 10, 30 shown in FIGS. 1-2, respectively.

As shown in FIG. 6, in an example embodiment, the brake 54 can be mounted on any side of the at least one outer disc 14, 16. For example, the brake 54 can be mounted on top of the wheel 50 to brake at least one outer disc 14, 16 using braking friction. A brake pad can be used to be in contact with the outer peripheral surface of the at least one outer disc 14, 16. In an alternative embodiment shown in FIG. 7, the wheel 60 has at least one cavity 62 configured to receive at least one linearly actuated pin 64 mounted on a linear actuator 66, 68 configured to selectively slide the pin 64 in an linear direction. Such selective insertion or removal of the pin 64 from the at least one cavity 62 controls the motion of the at least one outer disc 14, 16. In turn, the magnetic adhesion and the driving of the wheel 60 on the metallic surface 56 can be selectively controlled.

In another alternative embodiment shown in FIG. 8, the wheel 70 has at least one cavity 72 configured to receive a linearly actuated pin 74 mounted on a single linear actuator 76 configured to selectively slide the pin 74 in an linear direction. Such selective insertion or removal of the pin 74 from the at least one cavity 72 controls the motion of a single one of the outer discs 14, 16. At least one connecting rod 78, 80 can be used to connect the outer discs 14, 16 together. Accordingly, the ceasing of rotation of one disc, such as the disc 16 in FIG. 8, by the linear actuator 76 also stops the rotation of the other disc 14. In turn, the magnetic adhesion and the driving of the wheel 70 on the metallic surface can be selectively controlled.

In a second embodiment of an actuation system, as shown in FIG. 9, a wheel 90 has a motor 92 coupled to both outer discs 14, 16. The motor 92 rotates both outer discs 14, 16 while the inner disc 12 is relatively stationary due to action of a brake 94. When the brake 94 is not applied, the motor 92 can drive the entire wheel 90 due to the magnetic force holding all the disks 12, 14, 16 together. When the brake 94 is applied to the inner disc 12, the outer discs 14, 16 can rotate, causing the magnetic wheel 90 to change its current magnetic state to be on or off, as selected, by virtue of the supplemental or destructive flux lines, as discussed above. Accordingly, the adhesion of the wheel 90 to the metallic surface can be selectively controlled.

Figure 10:
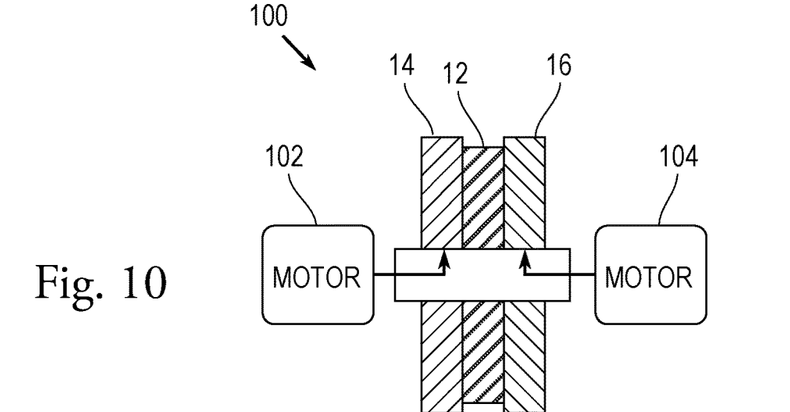
FIG. 10 is a cross-sectional view of an actuation system in a third embodiment.

In a third embodiment of an actuation system, as shown in FIG. 10, no brake is required to actuate and selectively control the magnetic state of the wheel 100. Instead, each outer disc 14, 16 is rotated independently by a respective motor 102, 104 to select the magnetic state of the wheel 100. To drive the wheel 100 forward or backward, the two motors 102, 104 are actuated to rotate the outer discs 14, 16 in the same direction. Such a common rotational direction can drive the entire wheel 100 either forward or backward depending on the rotation direction. To switch the magnetism on or off, the two motors 102, 104 are actuated to rotate the outer discs 14, 16 in opposite rotational directions. Such opposite rotations of the discs 14, 16 causes the magnetic wheel 100 to change its current magnetic state to control adhesion of the wheel 100 to a metallic surface, by virtue of the supplemental or destructive flux lines, as discussed above. The use of an inner rotation limit stopper, as described above, prevents the two discs 14, 16 from excessive rotation and stops the discs 12, 14, 16 relative to each other to achieve the selective switching of magnetism of the wheel 100. Accordingly, the adhesion of the wheel 100 to the metallic surface can be selectively controlled.

Figure 11:
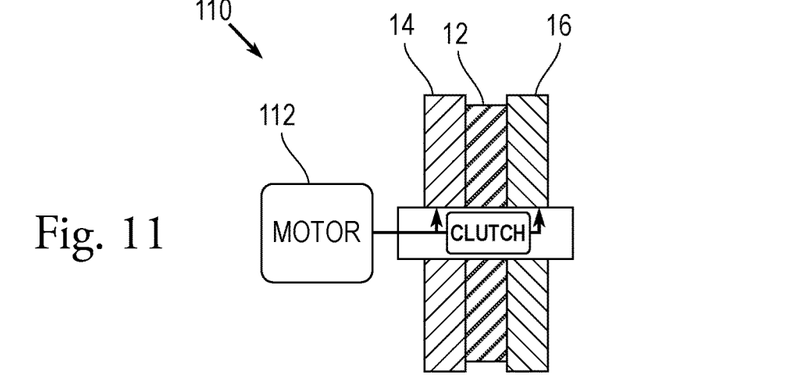
FIG. 11 is a cross-sectional view of an actuation system in a fourth embodiment.

In a fourth embodiment of an actuation system, as shown in FIG. 11, the wheel 110 does not utilize a braking system. Instead, a single motor 112 is directly connected to one of the two outer discs 14, 16. For example, the motor 112 is connected to the disc 14, and the other disc 16 connected to the motor 112 through a clutch-brake system having a clutch 114. When the clutch 114 is engaged, the two discs 14, 16 are coupled and driven together by the motor 112. Thus, the wheel 110 can be driven either forward or backward using the motor 112. To switch the magnetic flux of the wheel 110 on or off, the clutch 114 is disengaged, disconnecting the currently coupled disc from the motor 112. The clutch 114 applies a braking force on the output axle or shaft in the central axial bore 116, preventing the axle from rotating. By turning the motor 112 with braking force applied by the clutch 114 in this configuration, the magnetic flux of the wheel 110 switches on or off depending on the motor rotation direction, by virtue of the supplemental or destructive flux lines, as discussed above. Accordingly, the adhesion of the wheel 110 to the metallic surface can be selectively controlled.

Figure 12:
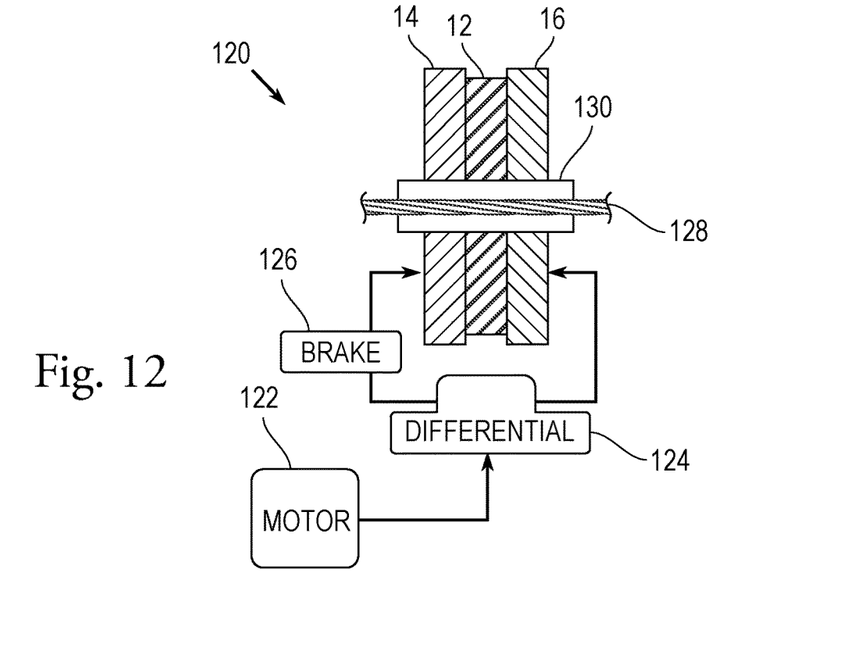
FIG. 12 is a cross-sectional view of an actuation system in a fifth embodiment.

In a fifth embodiment of an actuation system, as shown in FIG. 12, the wheel 120 has a motor 122 connected to a differential 124. The differential 124 is connected to at least one brake 126. The at least one brake 126 is controlled by the differential 124 to brake at least one of the outer discs 14, 16. For example, as shown in FIG. 12, the at least one brake 126 engages the outer disc 14. In operation, when the brake 126 is disengaged, the wheel 120 has free rotation about the axle 128 in the central axial bore 130. The motor 122 drives the differential 124. In turn, the differential 124 drives both of the outer discs 14, 16 in the same direction, causing the wheel 120 to be driven. When the brake 126 is engaged, the outer disc 14 stops rotating. In turn, the axle 128 stops rotating, and so the wheel 120 stops rotating. The differential 124 transmits the rotation of an axle of the motor 122 to one disc, for example, disc 16, only while the other disc 14 does not rotate. Then the rotation of the disc 16 causes the wheel 120 to switch its current magnetic flux on or off depending on rotation direction of the axle of the motor 122, by virtue of the supplemental or destructive flux lines, as discussed above. Accordingly, the adhesion of the wheel 120 to the metallic surface can be selectively controlled. In an example embodiment shown in FIG. 12, the brake 126 can engage the disc 14 itself. In an alternative embodiment, the brake 126 can engage the shaft 128.

Figure 13:
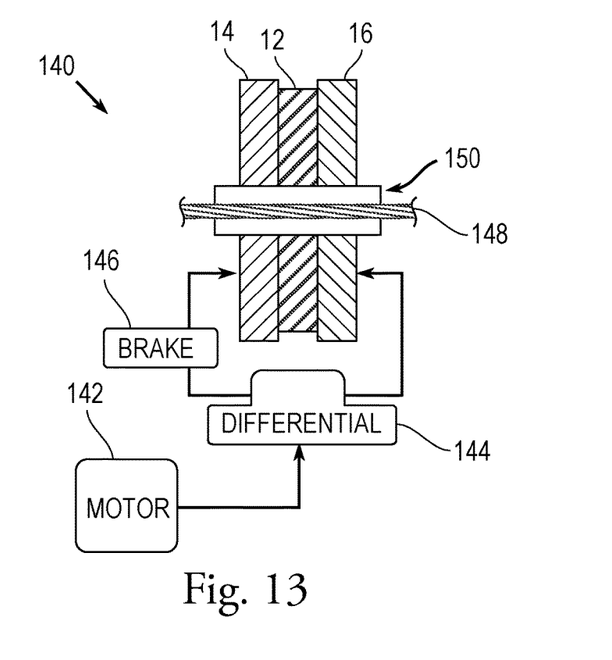
FIG. 13 is a cross-sectional view of an actuation system in a sixth embodiment.

In a sixth embodiment of an actuation system, as shown in FIG. 13, the wheel 140 has a motor 142 connected to a differential 144. The differential 144 is connected to both outer discs 14, 16. At least one brake 146 is controlled by the differential 144 to brake at least one of the outer discs 14, 16. For example, as shown in FIG. 13, the at least one brake 146 engages the outer disc 14. The brake 146 can include a braking motor configured to cause the brake 146 to engage or disengage the disc 14. In operation, when the brake 146 is disengaged, the wheel 140 has free rotation about the axle 148 in the central axial bore 150. The motor 142 drives the differential 144. In turn, the differential 144 drives both of the outer discs 14, 16 in the same direction, causing the wheel 140 to be driven. When the brake 146 is engaged, the outer disc 14 stops rotating. In turn, the axle 148 stops rotating, and so the wheel 140 stops rotating. The differential 144 transmits the rotation of an axle of the motor 142 to both discs 14, 16. Then the rotation of the disc 16 causes the magnetic wheel 140 to switch its current magnetic flux on or off depending on the rotation direction of the axle of the motor 142, by virtue of the supplemental or destructive flux lines, as discussed above. Accordingly, the adhesion of the wheel 140 to the metallic surface can be selectively controlled. In an example embodiment shown in FIG. 13, the brake 146 can engage the disc 14 itself. In an alternative embodiment, the brake 146 can engage the shaft 148.

Accordingly, in a driving mode, by electrically or mechanically disengaging the braking motor of the brake 146, the two discs 14, 16 can be driven by the driving motor 142. Such driving of both discs 14, 16 then drives the wheel 140 forward or backward depending on the rotation direction of the motor axle of the motor 142. Electrical or mechanical disengagement of the brake 146 allows the outer disc 14 to rotate with minimal influence from the braking motor of the brake 146. Alternatively, the braking motor can be driven in the same speed as the motor 142 so the discs 14, 16 rotate in sync.

In a switching mode, the magnetic flux of the wheel 140 is switched to be on or off. In one example embodiment, by applying a holding torque on the braking motor of the brake 146, the left disc 14 cannot rotate, and the differential 144 transmits all of the rotation/torque from the motor 142 to the right disc 16. With the left disc 14 relatively stationary while the right disc 14 rotates, the magnetism of the wheel 140 switches on or off depending on the direction of rotation of the motor axle of the motor 142. In another example embodiment, by applying a holding torque on the motor axle of the motor 142, the braking motor of the brake 146 can be actuated. Such actuation of the braking motor causes rotation of the left disc 14 in one direction. Since the input from the differential 144 is locked, the two outputs of the differential 144 are coupled in a reversed direction. By utilizing such a reversed rotation in mechanical differentials, the outer disc 16 rotates in an opposite direction to the outer disc 14. Such opposite rotation then switches the magnetic flux of the wheel 140 on or off, depending on the direction of rotation of the motor axle of the motor 142.

Figures 14, 15, 16:
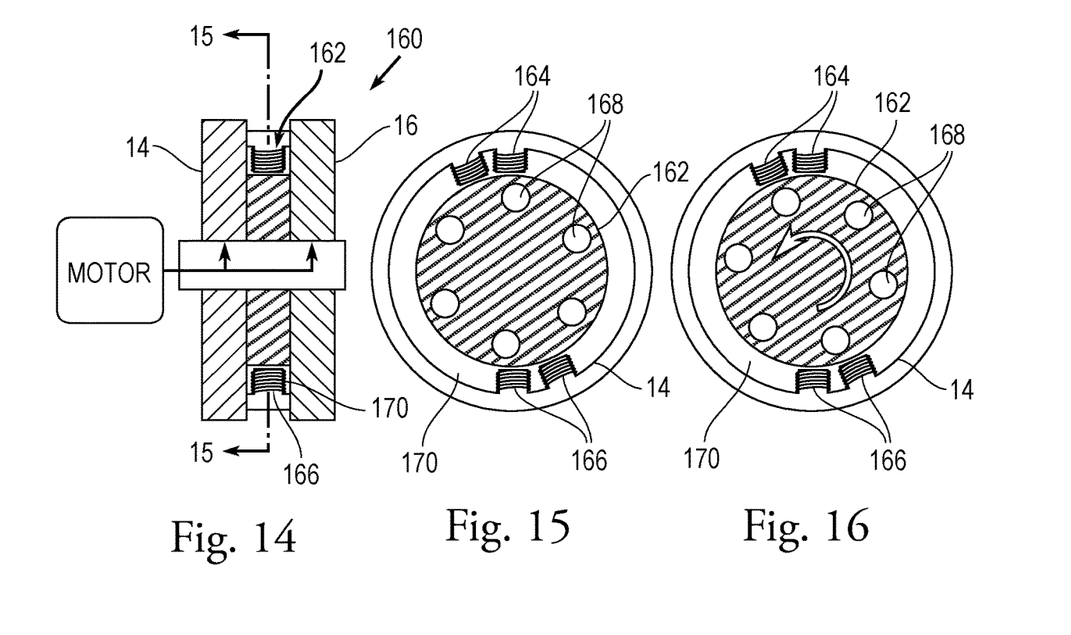
FIG. 14 is a cross-sectional view of an actuation system in a seventh embodiment.
FIG. 15 is a cross-sectional view of the actuation system of FIG. 14 along lines 15-15 with electromagnetic coils activated in a first configuration.
FIG. 16 is a cross-sectional view of the actuation system of FIG. 14 along lines 15-15 with electromagnetic coils activated in a second configuration.

In a seventh embodiment of an actuation system, as shown in FIGS. 14-16, a wheel 160 has outer discs 14, 16 on either planar side of an inner disc 162. The wheel 160 has electromagnetic coils 164, 166 disposed adjacent to the circumferential outer periphery of the inner disc 162. The inner disc 162 has apertures 168. The apertures 168 retain metallic structures. Alternatively, the apertures 168 retain magnets. The magnets can be permanent magnets. Alternatively, the magnets can be electromagnets with electromagnetic coils separate from the electromagnetic coils 164, 166. When the electromagnetic coils 164, 166 are activated, the metallic structures or magnets in the apertures 168 are attracted. Such magnetic attraction rotates the inner disc 162, as shown in FIGS. 15-16. The rotation of the inner disc 162 relative to the outer discs 14, 16 causes the magnetism of the wheel 160 to be switched on or off, by virtue of the supplemental or destructive flux lines, as discussed above. Accordingly, the adhesion of the wheel 160 to the metallic surface can be selectively controlled.

The electromagnetic coils 164, 166 are mounted on a coil carrier 170. The coil carrier 170 rotates in sync with the outer discs 14, 16. For example, the coil carrier 170 can be rigidly connected to the outer discs 14, 16. Accordingly, rotation of the outer discs 14, 16 by the motor 172 also rotates the electromagnetic coils 164, 166. In an example embodiment, the coil carrier 170 is composed of a non-ferromagnetic material to avoid negating the magnetic flux of the wheel 160 between the two magnetic conducting disks. A portion of the coil carrier 170 can extend into each electromagnetic coil 164, 166. The portion disposed in each electromagnetic coil 164, 166 can be composed of a ferromagnetic material for magnetic field generation. In an example embodiment, the inner disc 162 can rotate inside the coil carrier 170. Such rotation of the inner disc 162 can have a predetermined limited range due to rotation stoppers as described above.

In operation, when electric current is applied to at least one of the electromagnetic coils 164, 166, the magnets align in a way that turns on the magnetic flux of the wheel 160. If the at least one electromagnetic coil 164, 166 is turned off and another one of the electromagnetic coils 164, 166 with a slight angular offset is turned on, then the inner disc 162 rotates due to magnetic attraction and the magnetic flux of the wheel 160 turns off. In an example embodiment, the electromagnetic coils 164, 166 are only momentarily turned on in order to rotate the inner disc 162. Afterwards, the coils 164, 166 can be turned off since the inner disc 162 can be bi-stable in both the "on-state" and "off-state" of the wheel 160. To apply electric current to the electromagnetic coils 164, 166 which are on the rotating coil carrier 170, known mechanisms can be used to apply the electric current such as brushes, slip rings, or magnetic induction.

The electric current through the electromagnetic coils 164, 166 can be applied to control the rotation of the inner disc 162. In one embodiment, full-stepping is performed in which only one of the electromagnetic coils 164, 166 is turned on. Accordingly, the metallic structures or magnets in the apertures 168 move a full step from one electromagnetic coil to the next. In an alternative embodiment, half-stepping is performed in which both electromagnetic coils 164, 166 are turned on. Accordingly, the metallic structures or magnets in the apertures 168 move a half step to a halfway position between the electromagnetic coils 164, 166. Then a first coil is turned off, so the metallic structures or magnets in the apertures 168 move to complete the transition to the second coil. Such half-stepping allows for a smooth transition of the metallic structures or magnets in the apertures 168 to move from the first coil towards the second coil. In a further alternative embodiment, micro-stepping is performed, in which the electric current to a first coil of the electromagnetic coils 164, 166 is gradually reduced, and the electric current to the second coil of the electromagnetic coils 164, 166 is gradually increased. Such micro-stepping allows for a very smooth transition of the metallic structures or magnets in the apertures 168 to move from the first coil towards the second coil.

Figure 17:
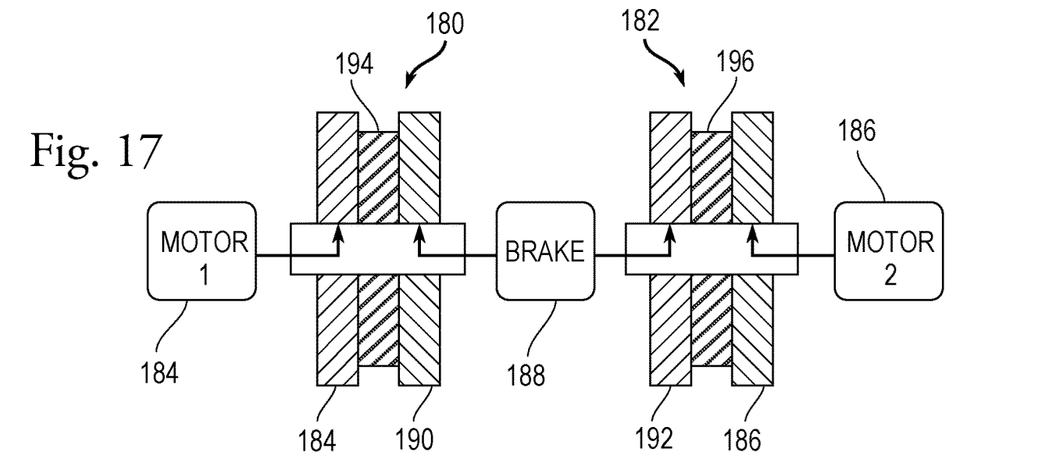
FIG. 17 is a cross-sectional view of an actuation system in an eighth embodiment.

In an eighth embodiment of an actuation system, as shown in FIG. 17, two wheels 180, 182 are operated on the vehicle by separate motors 184, 186 attached to the outermost discs of each wheel 180, 182, respectively. A common brake 188 engages the innermost discs 190, 192 to stop such innermost discs 190, 192 from rotating. In one embodiment, the common brake 188 includes holding or locking pins which can be extended into groves in both discs 190, 192. The pins extend in opposing directions to lock both discs 190, 192, but the pins can be driven by a single actuator. In another embodiment, the common brake 188 is a dual electric brake mounted on two independent shafts attached to both discs 190, 192. Applying the brake 188 stops both shafts. Accordingly, both discs 190, 190 can be stopped from rotating. In a further embodiment, the common brake 188 includes two brake pads. A respective brake pad engages a respective disc 190, 192, but both brake pads are actuated by a single actuator of the brake 188.

In operation, when the brake 188 is not applied, the vehicle is free to drive or steer differentially using the two motors 184, 186 depending on the rotation direction of the motor axle of each motor 184, 186. Each inner disc 190, 192 rotates with the rest of their respective wheels 180, 182 due to friction and magnetic attraction to the inner disc 194, 196 in each wheel 180, 182. Applying the brake 188 prevents the inner discs 194, 196 from rotating, which switches the magnetic flux of each wheel 180, 182 from on to off or vice versa depending on the rotation direction of the motor axle of each motor 184, 186, respectively, by virtue of the supplemental or destructive flux lines, as discussed above. Accordingly, the adhesion of each of the wheels 180, 182 to the metallic surface can be selectively controlled.

Figure 18:
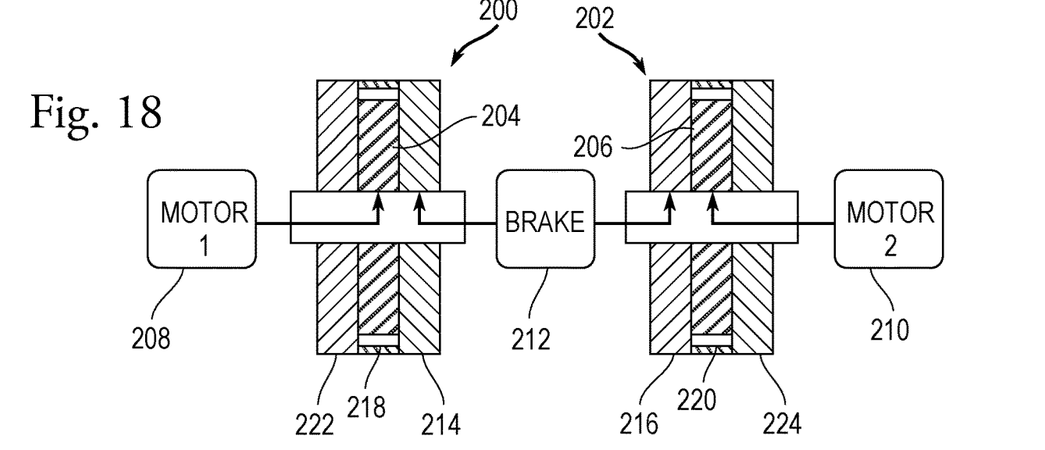
FIG. 18 is a cross-sectional view of an actuation system in a ninth embodiment.

In a ninth embodiment of an actuation system, as shown in FIG. 18, the wheels 200, 202 have inner discs 204, 206, respectively. The motors 208, 210 are coupled to the inner discs 204, 206, respectively. The brake 212 engages the innermost discs 214, 216. Non-ferromagnetic connecting rods 218, 220 are attached between the innermost discs 214, 216 and the outermost discs 222, 224, respectively. Accordingly, the discs 214, 222 rotate together and independently of the inner disc 204, and the disc 216, 224 rotate together and independently of the inner disc 206. Therefore, when the brake 212 is applied to the innermost discs 214, 216, the discs 214, 216, 222, 224 do not rotate.

When the brake 212 is not applied to the innermost discs 214, 216, the wheels 200, 202 can be driven by the motors 208, 210 rotating the inner discs 204, 206. Driving the motors 208, 210 in same direction leads to forward/backward motion of the wheels 200, 202. Driving the motors 208, 210 in opposite directions leads to differential steering. When the brake 212 is applied, the discs 214, 216, 222, 224 do not rotate due to the connecting rods 218, 220. Only the inner discs 204, 206 can rotate when the axle of the motors 208, 210 rotate, respectively. Such rotation of the inner discs 204, 206 switches the magnetic flux on or off, depending on the rotation of the motor axle of the motors 208, 210, respectively, by virtue of the supplemental or destructive flux lines, as discussed above. Accordingly, the adhesion of each of the wheels 200, 202 to the metallic surface can be selectively controlled. Since only the inner discs 204, 206 rotate, the wheels 200, 202 can stand still while the magnetic flux is switched on or off.

Figure 19:
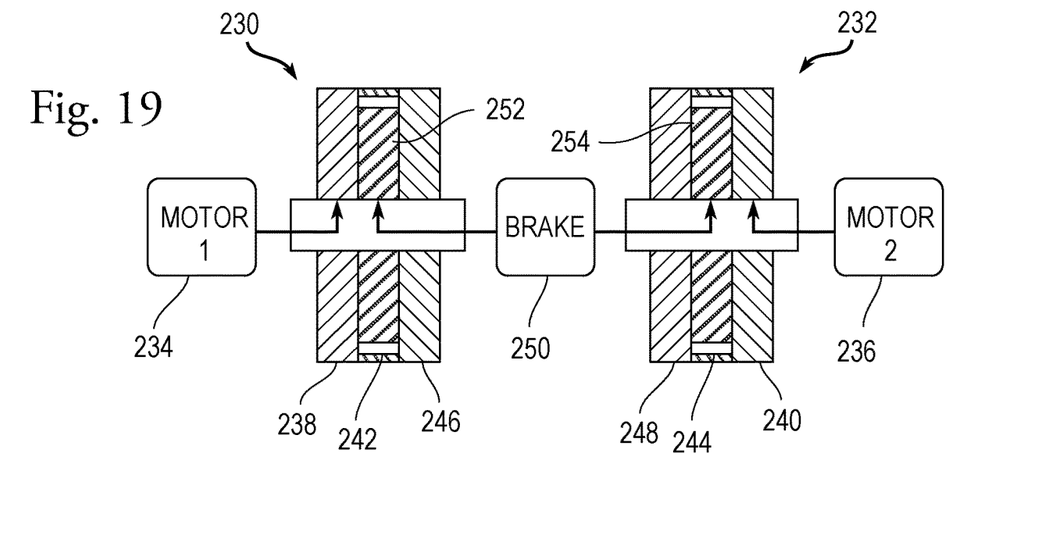
FIG. 19 is a cross-sectional view of an actuation system in a tenth embodiment.

In a tenth embodiment of an actuation system, as shown in FIG. 19, the wheels 230, 232 have motors 234, 236 respectively attached to the outermost disc 238, 240, respectively. Non-ferromagnetic connecting rods 242, 244 are attached between the outermost discs 238, 240 and innermost discs 246, 248 of each wheel 230, 232, respectively. The brake 250 engages the innermost discs 252, 254. Each motor 234, 236 drives the outermost discs 238, 240, respectively. When the brake 250 is applied, the brake 250 stops the inner discs 252, 254 from rotating. Since the motors 234, 236 rotate the outermost discs 238, 240 and the innermost discs 246, 248, the magnetic flux of the wheels 230, 232 turns on or off, by virtue of the supplemental or destructive flux lines, as discussed above. Accordingly, the adhesion of each of the wheels 230, 232 to the metallic surface can be selectively controlled.

The actuation systems described above can be one-wheel actuation systems, with examples of such systems shown in FIGS. 5-16. These actuation systems can be used if there is at least one magnetic wheel in the vehicle or system, such as a UAV 300 shown in FIG. 20. The UAV 300 can fly to a metallic surface 302, perch on the metallic surface 302 using the at least one wheel 304, 306, 308, and drive or crawl along the metallic surface 302 using controlled magnetic adhesion as described above. Each actuation system is disposed in a chassis 310 to which the wheels 304, 306, 308 are coupled. The actuation system allows for selective switching of the magnetic flux of the wheels 304, 306, 308, respectively, by virtue of the supplemental or destructive flux lines, as discussed above. Accordingly, the adhesion of each of the wheels 304, 306, 308 to the metallic surface 302 can be selectively controlled. The actuation system also drives at least one of the wheels 304, 306, 308 forward or backward along the length of the metallic surface. The actuation systems described above can also be two-wheel actuation systems, with examples of such systems shown in FIGS. 17-19. These actuation systems are used for controlling wheels 304, 306, 308 of vehicles such as the UAV 300. Such actuation systems can employ differential driving or steering, such that the vehicle can drive forward/backward or steer right/left. Such actuation systems also allow for selective switching of the magnetic flux of the wheels 304, 306, 308, by virtue of the supplemental or destructive flux lines, as discussed above. Accordingly, the adhesion of each of the wheels 304, 306, 308 to the metallic surface 302 can be selectively controlled. The advantage of these actuation systems includes optimization and also reduction of the number of components, since the wheels 304, 306, 308 can now share some components to perform the desired driving and steering functions.

Figure 20:
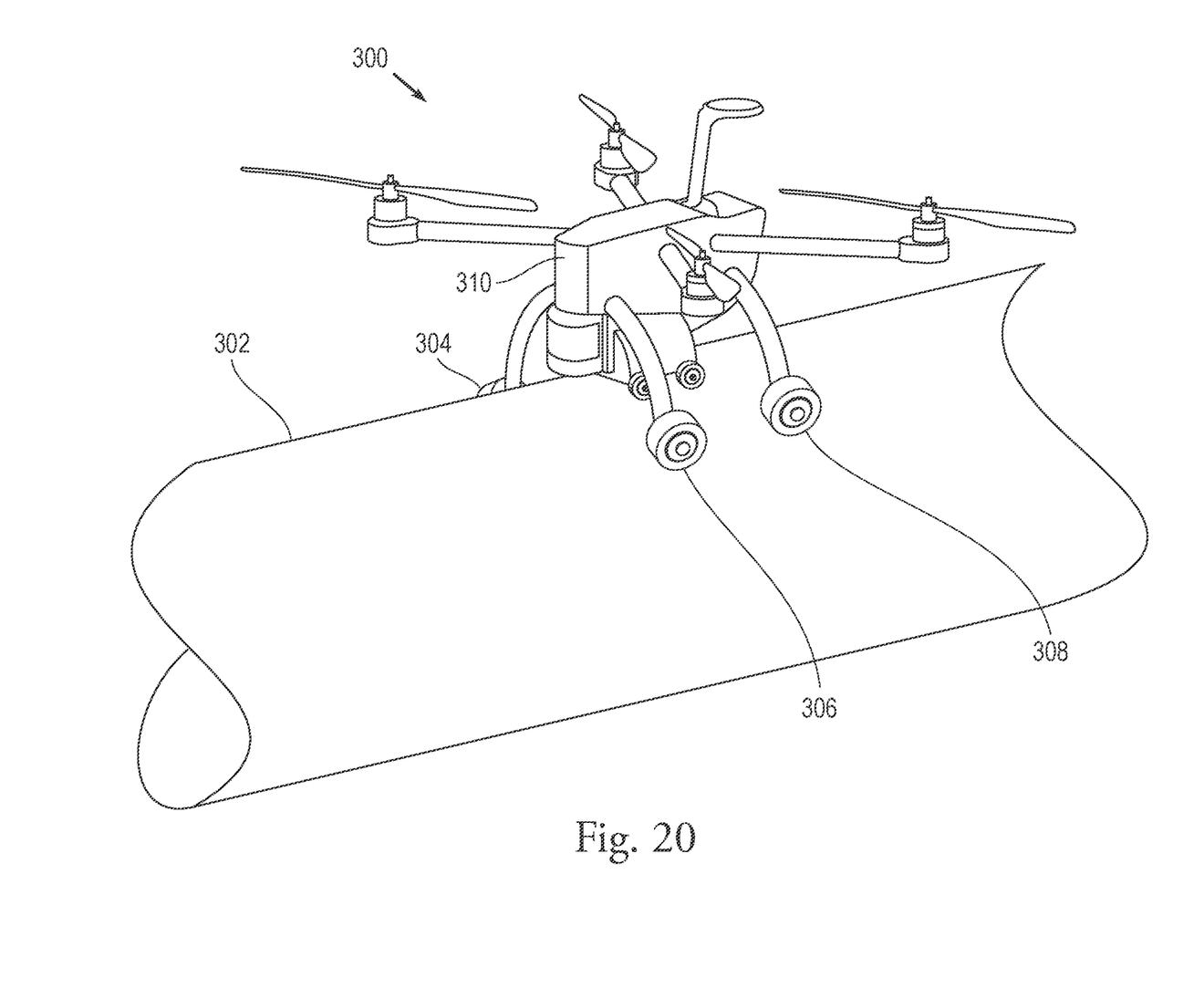
FIG. 20 illustrates a vehicle having the wheels of FIGS. 1-4.
Figure 21:
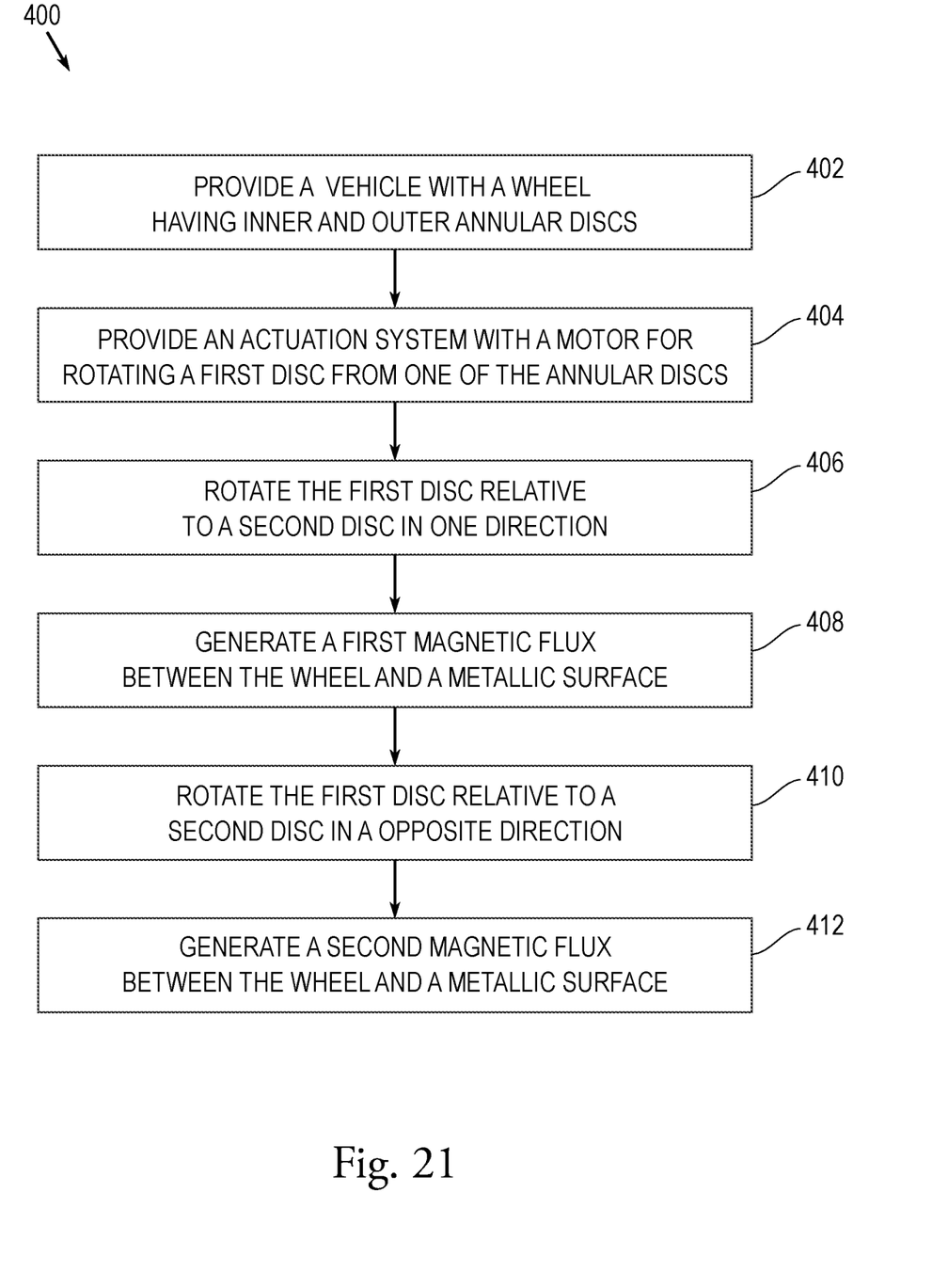
FIG. 21 is a flowchart of a method of operation using the wheels and an actuation system.

Referring to FIG. 21, a method 400 of operation of a vehicle, such as the UAV 300, comprises providing a vehicle in step 402 having a wheel, such as at least one of the wheels 304, 306, 308. The wheel has an inner annular disc and an outer annular disc. The wheel is configured to adhere magnetically to a metallic surface, in which at least one of the inner annular disc and the outer annular disc has a magnetic element. The method 400 also comprises providing an actuation system in step 404. The actuation system is disposed in the vehicle and is coupled to the wheel. The actuation system has a motor configured to rotate a first disc of the inner annular disc or the outer annular disc, and to not rotate a second disc of the inner annular disc or the outer annular disc. The method 400 then rotates the first disc relative to the second disc by a predetermined rotational angle in a first rotational direction in step 406. The method 400 then generates a first magnetic flux in step 408 between the metallic surface and one of the first disc and the second disc to increase the adhesion of the wheel to the metallic surface. The method 400 further rotates the first disc relative to the second disc by a predetermined rotational angle in a second rotational direction opposite the first rotational direction in step 410. The method 400 then generates a second magnetic flux in step 412 between the metallic surface and the one of the first disc and the second disc to decrease the adhesion of the wheel to the metallic surface. The second magnetic flux is less than the first magnetic flux. The magnetic fluxes from the wheel to the metallic surface are modified by virtue of the supplemental or destructive flux lines, as discussed above. Accordingly, the adhesion of the wheel to the metallic surface can be selectively controlled.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An actuation system coupled to a wheel having an inner annular disc and an outer annular disc and configured to adhere magnetically to a metallic surface, wherein at least one of the inner annular disc and the outer annular disc has a magnetic element, comprising:

a motor configured to rotate a first disc of the inner annular disc or the outer annular disc, and to not rotate a second disc of the inner annular disc or the outer annular disc, wherein in a first configuration, the motor rotates the first disc relative to the second disc by a predetermined rotational angle in a first rotational direction, thereby generating a first magnetic flux between the metallic surface and one of the first disc and the second disc to increase the adhesion of the wheel to the metallic surface, and wherein in a second configuration, the motor rotates the first disc relative to the second disc by a predetermined rotational angle in a second rotational direction opposite the first rotational direction, thereby generating a second magnetic flux between the metallic surface and the one of the first disc and the second disc to decrease the adhesion of the wheel to the metallic surface, wherein the second magnetic flux is less than the first magnetic flux.

2. The actuation system of claim 1, wherein the first disc is the inner annular disc, and
the second disc is the outer annular disc.

3. The actuation system of claim 1, further comprising:
a brake configured to stop rotation of the inner annular disc.

4. The actuation system of claim 1, further comprising:
a brake configured to stop rotation of the outer annular disc.

5. The actuation system of claim 1, wherein the first disc is the outer annular disc, and
the second disc is the inner annular disc.

6. The actuation system of claim 5, further comprising:
a clutch configured to engage the outer annular disc.

7. The actuation system of claim 5, further comprising:
a coil carrier coupled to the outer annular disc and configured to retain an electromagnetic coil,
wherein activation of the electromagnetic coil rotates the inner annular disc relative to the outer annular disc to control the magnetic flux of the wheel, thereby controlling the adhesion of the wheel to the metallic surface.

8. A vehicle comprising:
a chassis;
a wheel coupled to the chassis and having an inner annular disc and an outer annular disc and configured to adhere magnetically to a metallic surface, wherein at least one of the inner annular disc and the outer annular disc has a magnetic element; and
an actuation system disposed in the chassis and coupled to the wheel, having:
a motor configured to rotate a first disc of the inner annular disc or the outer annular disc, and to not rotate a second disc of the inner annular disc or the outer annular disc,
wherein in a first configuration, the motor rotates the first disc relative to the second disc by a predetermined rotational angle in a first rotational direction, thereby generating a first magnetic flux between the metallic surface and one of the first disc and the second disc to increase the adhesion of the wheel to the metallic surface, and
wherein in a second configuration, the motor rotates the first disc relative to the second disc by a predetermined rotational angle in a second rotational direction opposite the first rotational direction, thereby generating a second magnetic flux between the metallic surface and the one of the first disc and the second disc to decrease the adhesion of the wheel to the metallic surface, wherein the second magnetic flux is less than the first magnetic flux.

9. The vehicle of claim 8, wherein the first disc is the inner annular disc, and the second disc is the outer annular disc.

10. The vehicle of claim 8, further comprising:

a brake configured to stop rotation of the inner annular disc.

11. The vehicle of claim 8, further comprising:

a brake configured to stop rotation of the outer annular disc.

12. The vehicle of claim 8, wherein the first disc is the outer annular disc, and the second disc is the inner annular disc.

13. The vehicle of claim 12, further comprising:

a clutch configured to engage the outer annular disc.

14. The vehicle of claim 12, further comprising:

a coil carrier coupled to the outer annular disc and configured to retain an electromagnetic coil, wherein activation of the electromagnetic coil rotates the inner annular disc relative to the outer annular disc to control the magnetic flux of the wheel, thereby controlling the adhesion of the wheel to the metallic surface.

15. A method, comprising:

providing a vehicle having a wheel with an inner annular disc and an outer annular disc and configured to adhere magnetically to a metallic surface, wherein at least one of the inner annular disc and the outer annular disc has a magnetic element;

providing an actuation system disposed in the vehicle and coupled to the wheel, having:

a motor configured to rotate a first disc of the inner annular disc or the outer annular disc, and to not rotate a second disc of the inner annular disc or the outer annular disc;

rotating the first disc relative to the second disc by a predetermined rotational angle in a first rotational direction;

generating a first magnetic flux between the metallic surface and one of the first disc and the second disc to increase the adhesion of the wheel to the metallic surface;

rotating the first disc relative to the second disc by a predetermined rotational angle in a second rotational direction opposite the first rotational direction; and generating a second magnetic flux between the metallic surface and the one of the first disc and the second disc to decrease the adhesion of the wheel to the metallic surface, wherein the second magnetic flux is less than the first magnetic flux.

16. The method of claim 15, wherein the first disc is the inner annular disc, and the second disc is the outer annular disc.

17. The method of claim 15, further comprising:

stopping rotation of the inner annular disc by a brake.

18. The method of claim 15, further comprising:

stopping rotation of the outer annular disc by a brake.

19. The method of claim 15, wherein the first disc is the outer annular disc, and the second disc is the inner annular disc.

20. The method of claim 19, further comprising:

engaging the outer annular disc with a clutch.

\* \* \* \* \*